Feb. 25, 1947.     C. E. PATTERSON     2,416,592
POWER EARTH MOVER
Filed Aug. 2, 1940     9 Sheets-Sheet 2

INVENTOR:
CECIL E. PATTERSON,
By Chas. M. Nissen,
ATTY.

Feb. 25, 1947. C. E. PATTERSON 2,416,592
POWER EARTH MOVER
Filed Aug. 2, 1940 9 Sheets-Sheet 5

INVENTOR:
CECIL E. PATTERSON,
By Chas. M. Nissen,
ATTY.

Feb. 25, 1947.  C. E. PATTERSON  2,416,592
POWER EARTH MOVER
Filed Aug. 2, 1940  9 Sheets-Sheet 6
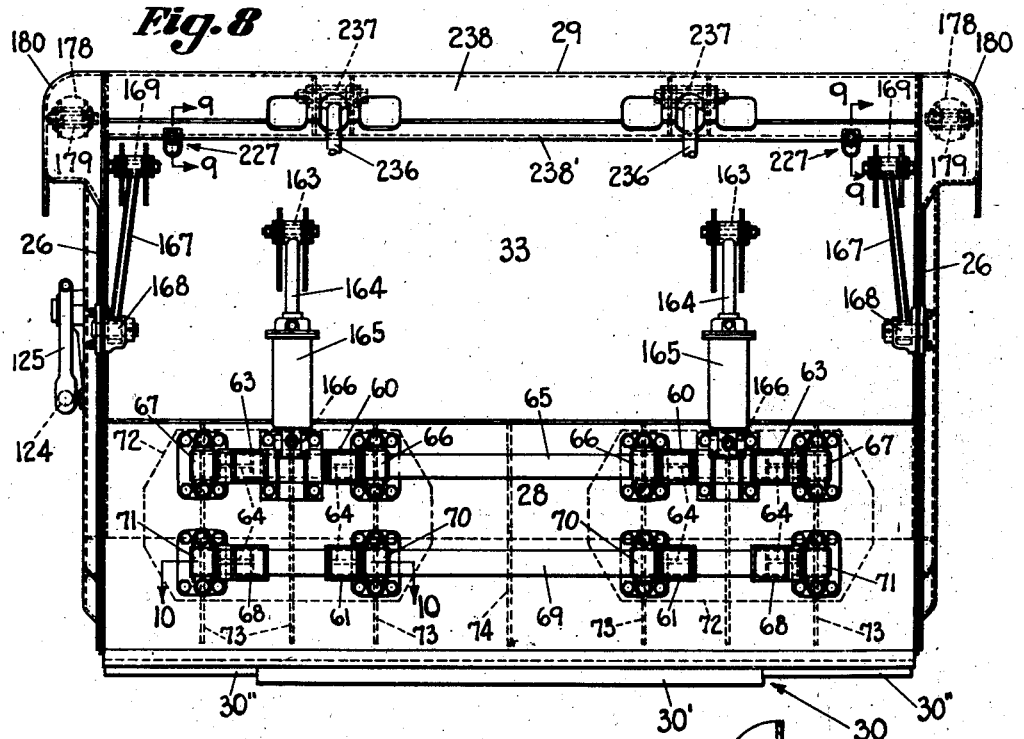
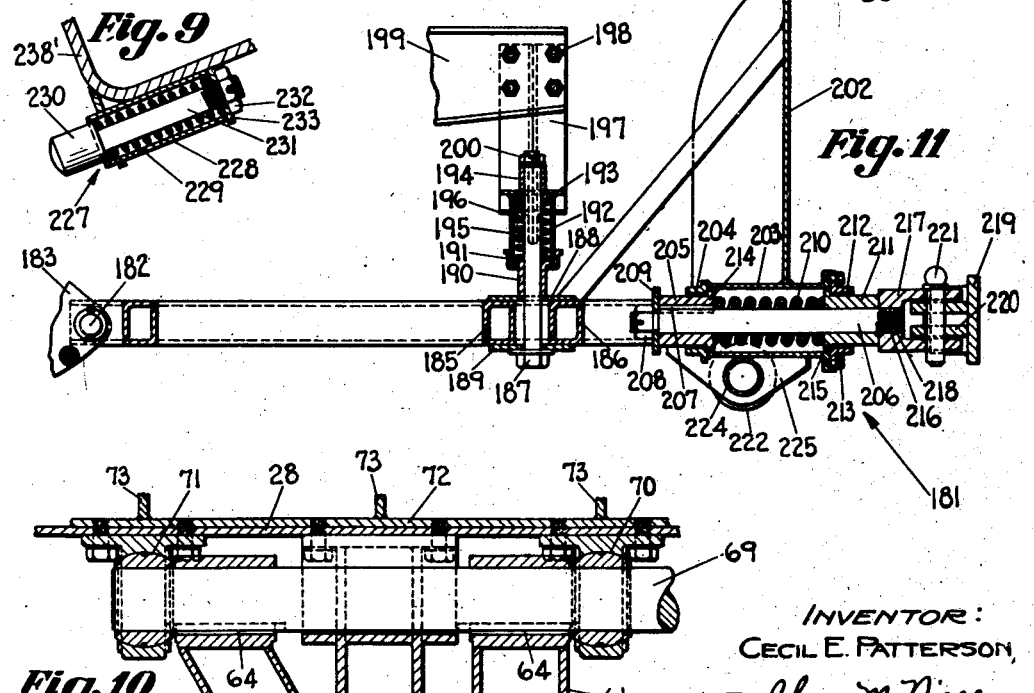
INVENTOR:
CECIL E. PATTERSON,
By Chas. M. Nissen,
ATTY.

Feb. 25, 1947. C. E. PATTERSON 2,416,592
POWER EARTH MOVER
Filed Aug. 2, 1940 9 Sheets-Sheet 7
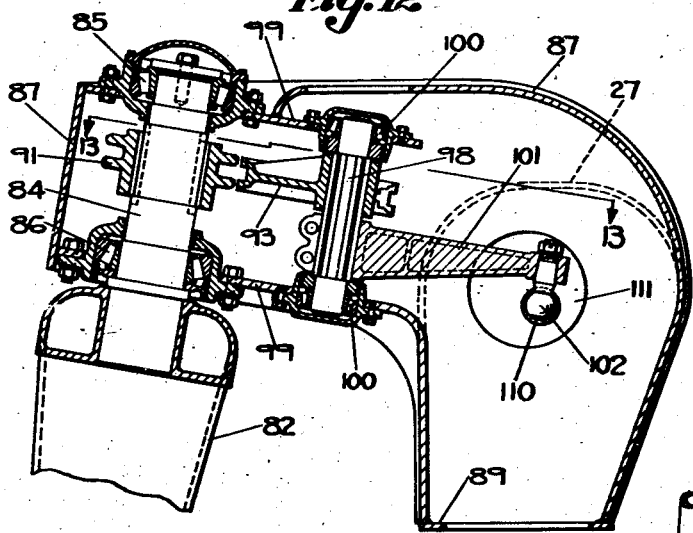
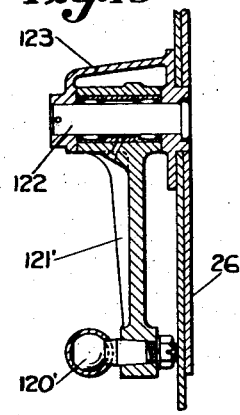
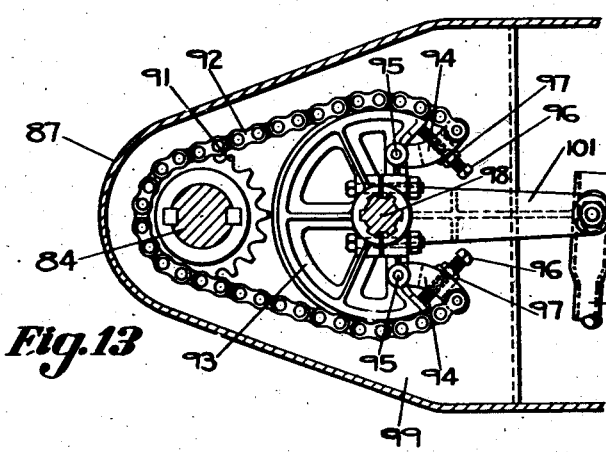
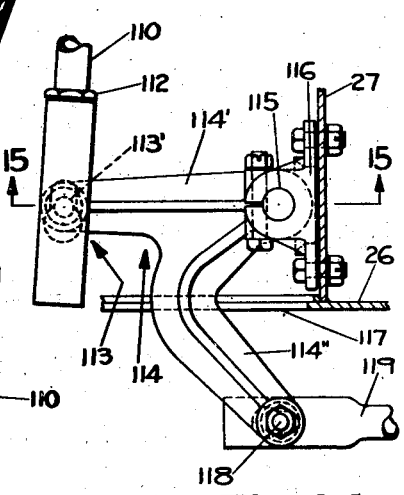
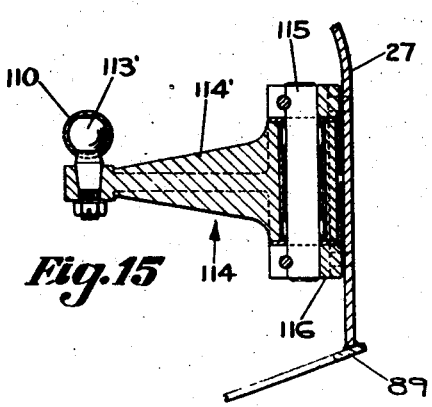
INVENTOR:
CECIL E. PATTERSON,
By Chas. M. Nissen,
ATT'Y Feb. 25, 1947.  C. E. PATTERSON  2,416,592
POWER EARTH MOVER
Filed Aug. 2, 1940  9 Sheets-Sheet 8

INVENTOR:
CECIL E. PATTERSON,
By Chas. M. Niesen,
ATT'Y

Feb. 25, 1947.  C. E. PATTERSON  2,416,592
POWER EARTH MOVER
Filed Aug. 2, 1940  9 Sheets-Sheet 9

INVENTOR:
CECIL E. PATTERSON,
By Chas. M. Nissen,
ATTY.

Patented Feb. 25, 1947

2,416,592

UNITED STATES PATENT OFFICE 2,416,592

POWER EARTH MOVER

Cecil E. Patterson, Mansfield, Ohio, assignor to The Galion Iron Works & Manufacturing Company, a corporation of Ohio Application August 2, 1940, Serial No. 349,765

38 Claims. (Cl. 37—124)

My invention relates to earth movers of the type which gathers earth from the ground surface and carries such gathered material to other places where it is to be unloaded and spread for filling in or building up purposes, and one of the objects of my invention is the provision of improved and efficient apparatus of this type.

Another object of the invention is the provision of improved mechanism for carrying the front end of an earth moving bowl on a steering wheel unit and carrying the rear end of the earth moving bowl on a supporting unit and associating with such units adjusting mechanism to facilitate the operation of the machine in gathering, hauling and spreading material.

A further object of the invention is the provision of improved steering mechanism for an earth mover, one end of which is carried by a steering wheel unit and the other end of which is carried by a supporting unit.

Another object of the invention is the provision of a power operated unit combined with pusher mechanism to enable a separate tractor to add its power in the operation of the machine.

A further object of the invention is the provision of pusher mechanism in an earth mover having a ground cutting blade to enable a separate tractor to push the machine while the cutting blade is making a deep cut in the ground surface.

Another object of the invention is the provision of a self-propelled earth mover having a ground cutting blade, combined with pushing mechanism for engagement by a separate tractor, so that after material has been gathered by deep cuts with the help of the separate tractor the self-propelled earth mover may be used alone for hauling and spreading purposes.

A further object of the invention is the provision of improved and efficient supporting connections between the rear end of an earth moving bowl and a supporting unit including means for tilting the bowl without materially tilting the supporting unit.

Another object of the invention is the provision of improved pushing connections between a power traction unit and an earth moving bowl in advance of the same.

A further object of the invention is the provision of a receiving plate back of a ground cutting blade combined with an ejector having its lower edge guided to scrape along such receiving plate during an ejecting operation.

Another object of the invention is the provision of an improved and efficient hydraulic system for earth movers including hydraulic reciprocating motors for tilting an earth receiving bowl, for controlling a gate associated with a front opening in the bowl, and for operating an ejector in the bowl.

A further object of the invention is the provision of mechanism for reinforcing the semi-cylindrical gate in an earth mover.

Another object of the invention is the reinforcement of the plates of an ejector of an earth mover.

A further object of the invention is the provision of steering mechanism for an earth mover combined with a pneumatic motor controlled by a steering wheel to assist the operator in steering the machine by power.

Other objects of the invention will appear hereinafter, the novel features and combinations being set forth in the appended claims.

In the accompanying drawings,

Figs. 1 and 2, placed end to end, show a side elevation of a power-operated earth mover embodying my invention;

Fig. 1ª is a sectional plan view taken on the line 1ª—1ª of Fig. 1;

Fig. 2ª is a sectional view taken on the line 2ª—2ª of Fig. 2, looking in the direction of the arrows;

Figs. 3 and 4, placed end to end, show a plan view of the power-operated earth mover;

Fig. 5, placed end to end with Fig. 1, shows in elevation a modification;

Fig. 8 is a rear elevational view of the ejector plate and the mechanism for operating the same, shown in plan in Fig. 4;

Fig. 9 is a sectional view taken on the line 9—9 of Fig. 8, looking in the direction of the arrows;

Fig. 10 is a sectional plan view taken on either of the lines 10—10 or Fig. 8;

Fig. 11 is a sectional elevational view of the tractor pushing mechanism shown in plan in Fig. 4;

Fig. 12 is a sectional elevational view of the steering head and the steering mechanism mounted therein;

Fig. 13 is a sectional plan view taken on the line 13—13 of Fig. 12;

Fig. 14 is an enlarged plan view of the bell crank shown in dotted lines at the lower left-hand corner of Fig. 3;

Fig. 15 is a sectional view taken on the line 15—15 of Fig. 14, looking in the direction of the arrows;

Fig. 16 is a sectional elevation taken on the line 16—16 of Fig. 1, looking in the direction of the arrows;

Fig. 17 represents a piping diagram for the hydraulic apparatus used in making the various adjustments except that of the steering wheel unit;

Figure 1:
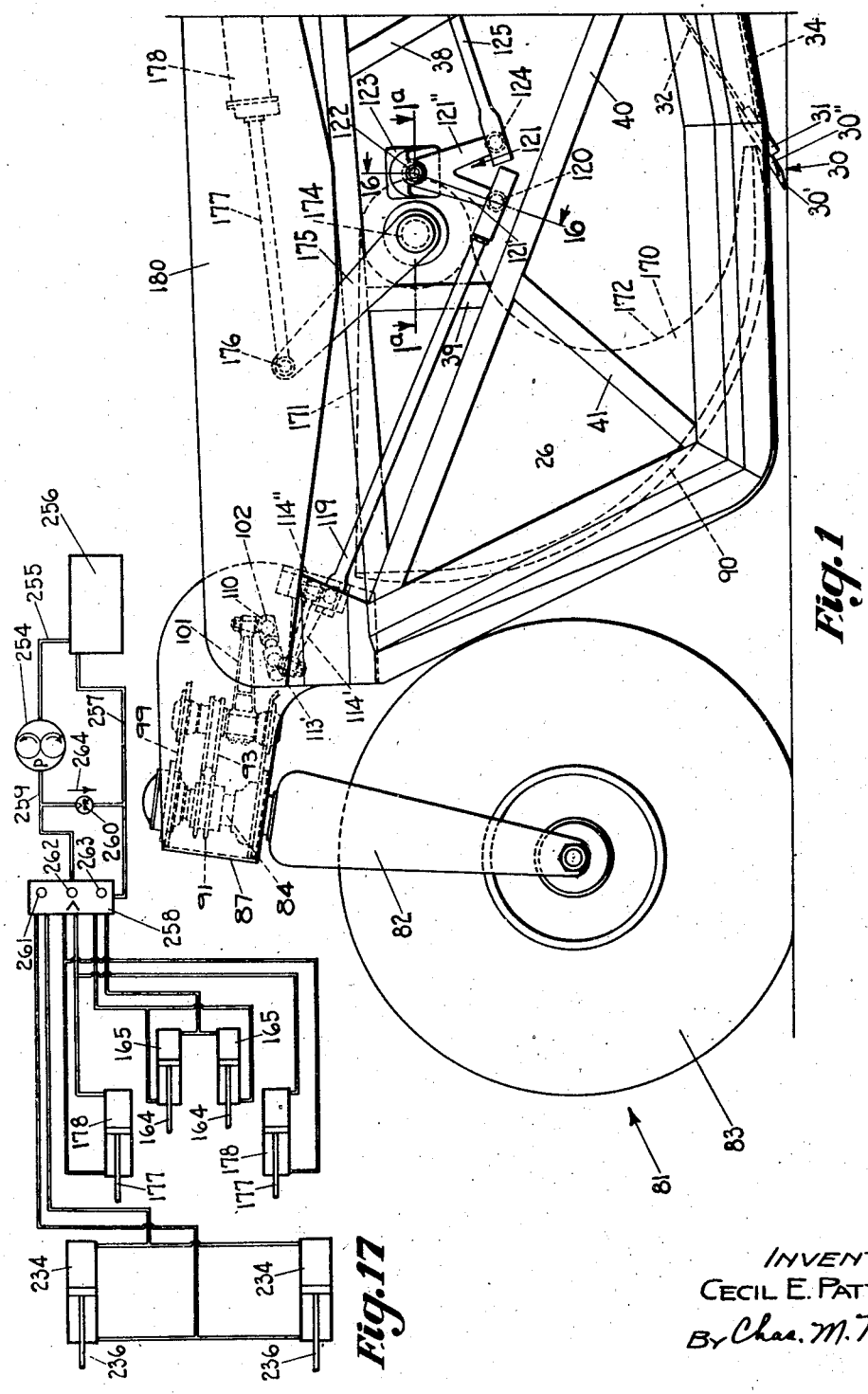
Figure 2:
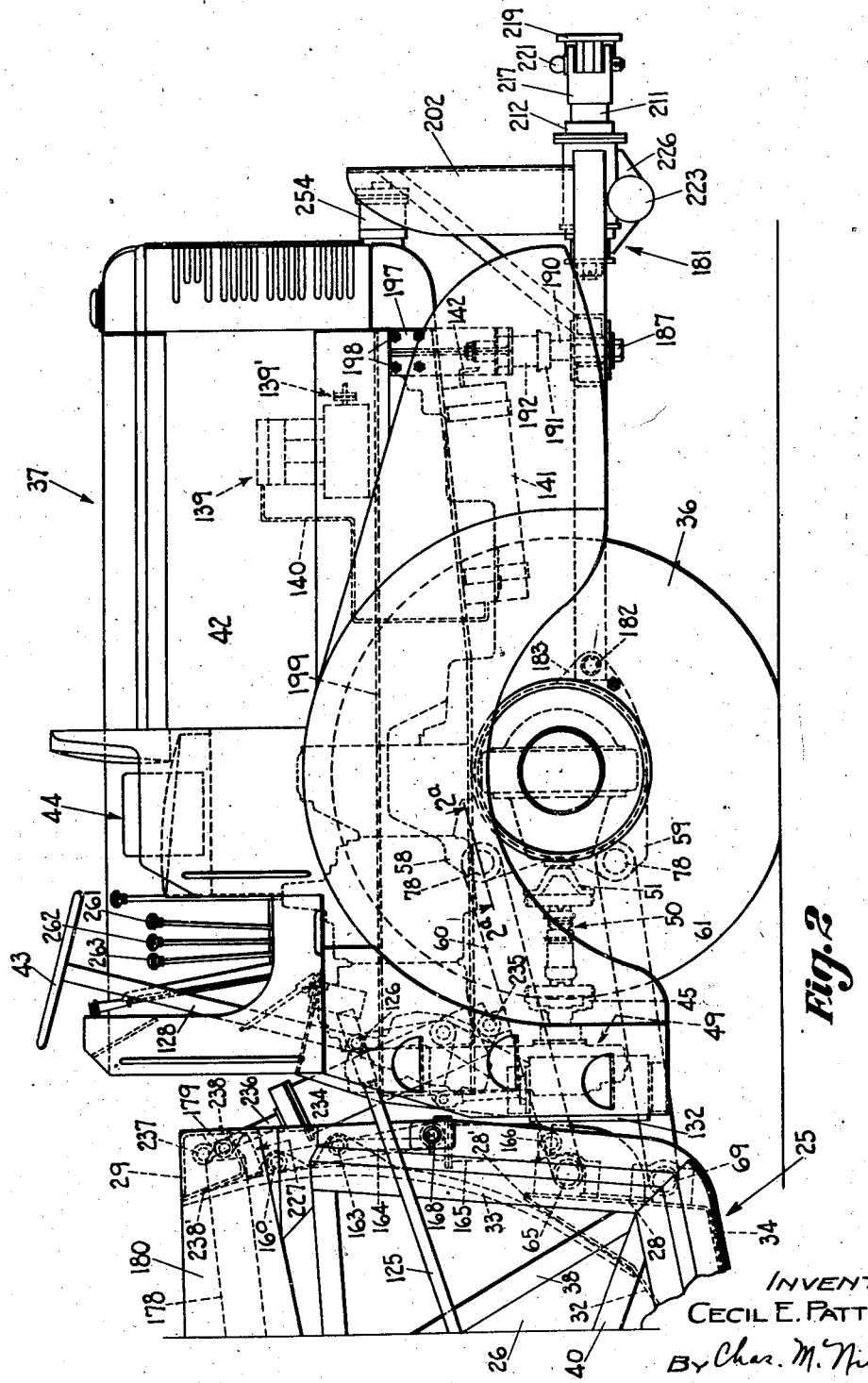
Figure 3:
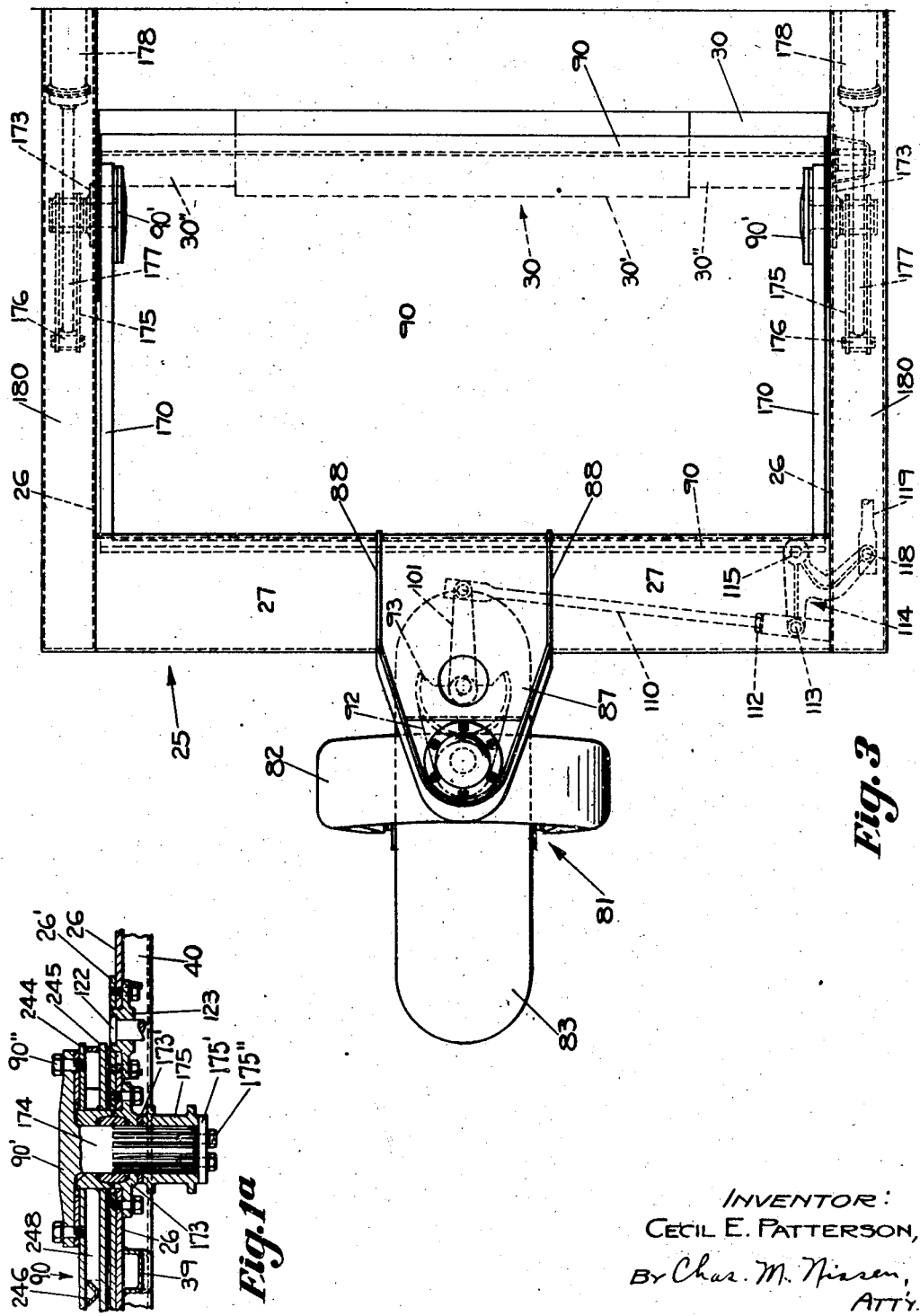
Figure 4:
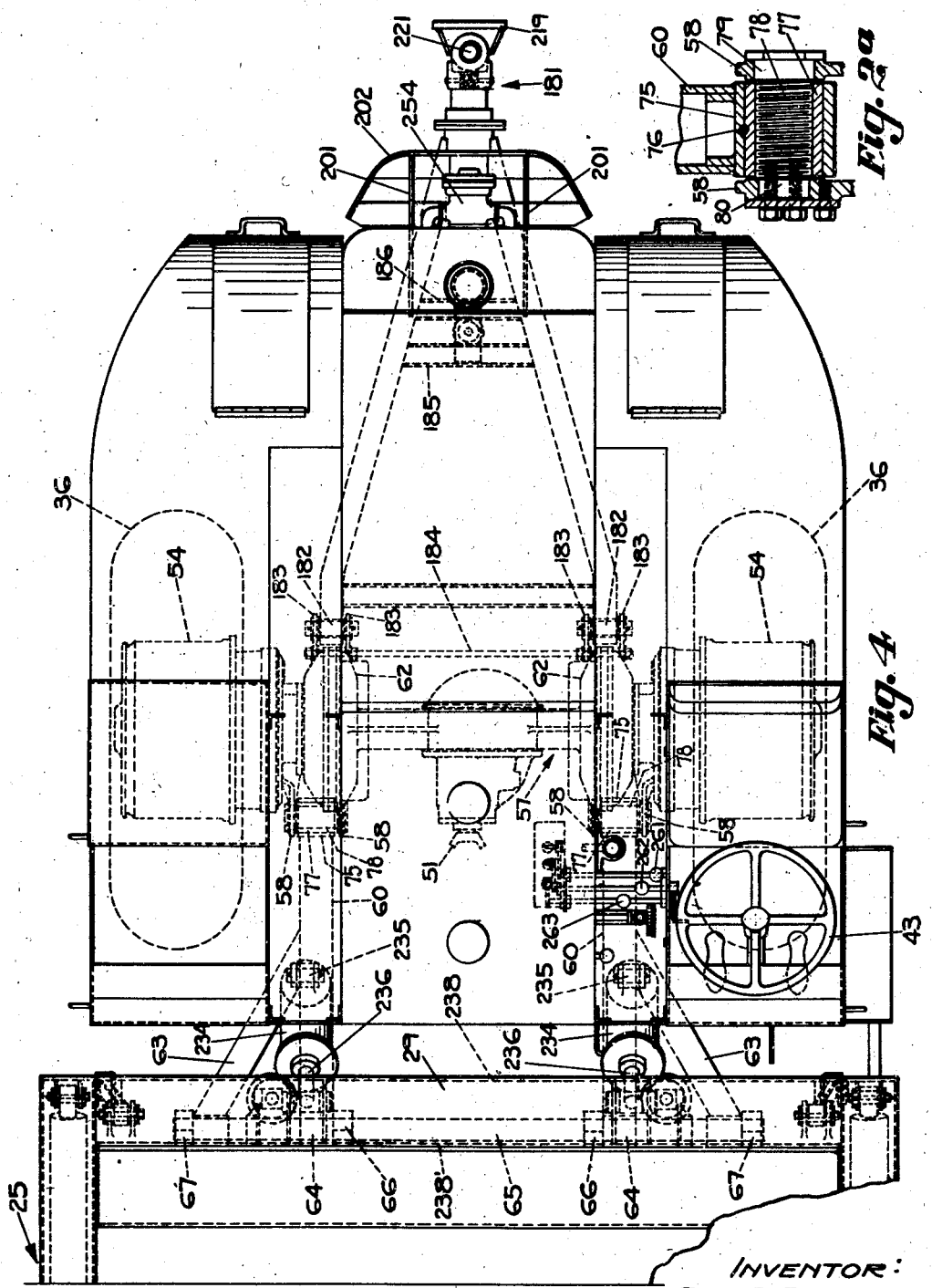

Referring to Figs. 1 and 2 placed end to end and Figs. 3 and 4 placed end to end, it will be seen that 25 designates the framework for the bowl or earth carrier comprising side plates 26, 26 the upper front corners of which are connected by the cross-plates 27. The rear ends of the side plates 26, 26 are connected by the upright back plate 28 and rear upper cross-plate 29.

Extending entirely across the bowl framework between the side plates 26, 26 is a transverse scraper or cutting blade 30 secured rigidly to a reinforcing plate 31 as shown in Fig. 1. Extending rearwardly from the scraper or cutting blade 30 is a receiving plate or moldboard 32. This receiving plate 32 spans the space between the inner walls of the side plates 26, 26 and extends upwardly and rearwardly for connection at 28' to the upright back plate 28 which is an extension of the bottom plate 34, as shown in Figs. 1 and 2 placed end to end.

Figure 5:
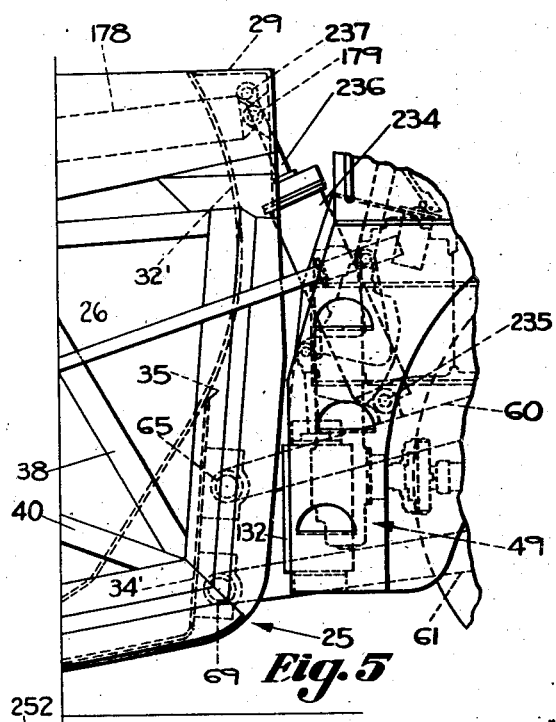

In the modification shown in Fig. 5 the receiving plate 32 inclines rearwardly gradually into the plate 32' and thence extends upwardly to the cross-plate 29, it being understood that the continuous plate 32, 32' extends between the side plates 26, 26 and is rigidly connected to the bowl framework. Intermediate its ends the plate 32' may be secured by welding at 35 to the upper end of the back plate 34' which extends downwardly and forwardly to connect the side plates 26, 26 of the bowl framework and form a rigid bottom therefor rearwardly of the cutting blade 30. In both the forms shown in Figs. 1 and 2 placed end to end and in the form shown in Figs. 1 and 5 placed end to end, it is desirable that the rearward and upward inclination of the plate 32 be gradual so that the bowl at the rear end will have earth carrying capacity and thereby add to the weight on the traction wheels 36, 36 to increase the traction of the power traction unit 37.

On the outer side of the bowl frame are various reinforcing channels 38, 39, 40 and 41 each of which may have their edges welded to the outer surfaces of the side plates 26, 26. This is illustrated in Fig. 1ª which is a plan view taken on the line 1ª—1ª of Fig. 1. In this view the chanel 39 is shown in section and a portion of the channel 40 is shown in plan.

The power traction unit 37 comprises an internal combustion engine 42, the radiator of which faces rearwardly. A steering wheel 43 is mounted adjacent the operator's seat 44. At the operator's station are also the various levers for shifting the gears in the transmission for various speeds ahead and rearward. The operator may also control from his station the clutch mechanism and the brake mechanism and at the operator's station are also placed a plurality of valves one for controlling each of the hydraulic motors, as hereinafter more fully explained. The bowl frame being entirely open at its top as shown in Figs. 3 and 4 placed end to end, the operator from his station can easily observe either the filling or the emptying of the earth carrier and therefore operate the controls accordingly to secure efficiency both in gathering the material and in spreading it.

Figure 22:
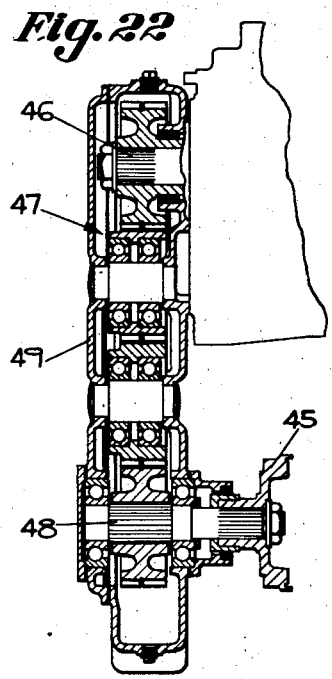
Fig. 22 is a sectional elevational view taken vertically through the transfer casing and the gearing therein.
Figure 21:
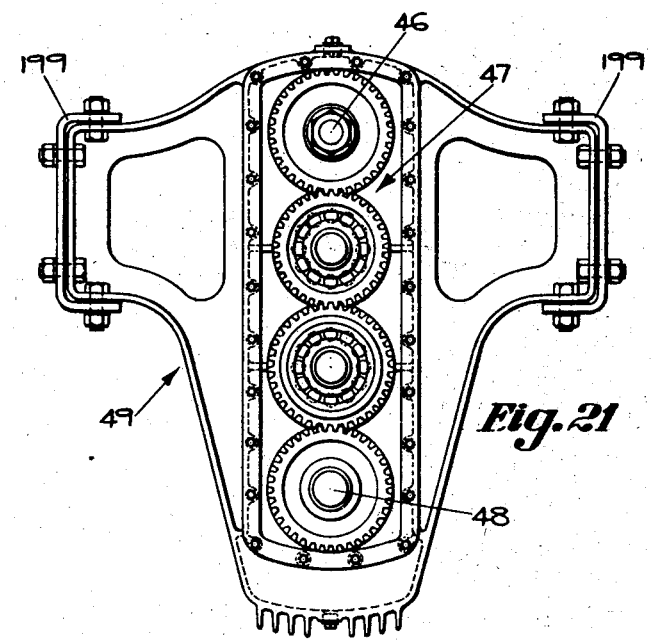
Fig. 21 is an elevational view of the gearing in the transfer casing connected through conventional transmission and clutch to the internal combustion engine of the two-wheeled tractor connected to the earth moving scraper bowl for operation and transportation thereof.
Figure 23:
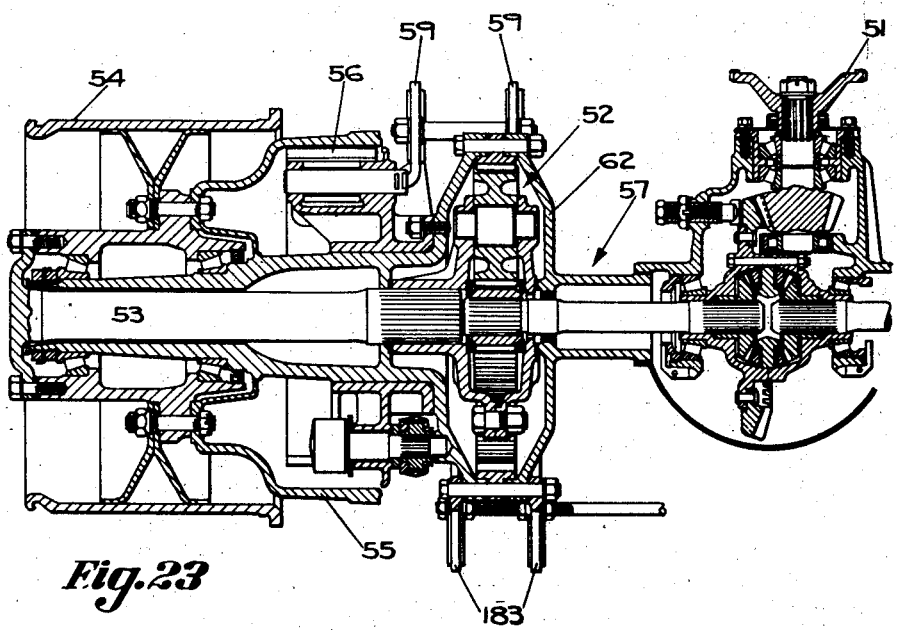
Fig. 23 is a sectional plan of a portion of the power transmission of the power traction unit shown in plan in Fig. 4.

The internal combustion engine 42 is connected as shown in Figs. 2, 21 and 22 to a coupling member 45. The crank shaft of the engine is connected by means of a clutch to the variable speed transmission and the latter in turn by means of the shaft 46 is connected through a train of gearing 47 to the lowermost shaft 48, such train of gearing being mounted in a transfer case 49 located in advance of the traction wheels 36, 36. By means of universal joint 50 the coupling member 45 is connected to the coupling member 51 which in turn is connected to differential transmission, as shown in Fig. 23. Power is supplied through the planetary gearing 52 to the axle 53 which carries the hub 54 of one of the wheels 36. Connected to the hub 54 is a brake drum 55, the interior of which is associated with brake mechanism 56. Fig. 23 shows the hub and brake mechanism for one of the wheels 36 but it should be understood that the opposite wheel 36 is also provided with planetary gearing and brake mechanism the same as that shown in Fig. 23.

The axle housing 57 of the power traction unit is preferably of steel secured rigidly to the frame of the internal combustion engine 42. Although the axle housing 57 may be in sections, these sections are rigidly bolted together. The axle housing 57 being rigidly secured to the supporting frame of the internal combustion engine, moves bodily with the latter when tilted in either direction. For balancing purposes, the engine is mounted on and over the axle housing intermediate the ends of the engine preferably with the flywheel of the engine directly above the axle, and while the power traction unit would be an unstable tractor when disconnected from the bowl framework, means are provided for stabilizing the tractor unit and even keeping the same substantially horizontal for the various positions of the bowl framework relative to the ground surface, thus adding to the comfort of the operator at his station during all operations.

Rigidly connected to the axle housing 57 and extending forwardly therefrom are two pairs of brackets 58, 59 as illustrated in dotted lines in Fig. 2. The brackets 59 are shown in plan view in Fig. 23. Pivotally connected to the pairs of brackets 58 and 59 are forwardly and downwardly extending links 60 and 61. As shown in Fig. 4, the pairs of brackets 58 and 59 are located in spaced-apart positions along the axle housing 57. Preferably the pairs of brackets 58 and 59 are located adjacent the housings 62, 62 for the planetary gearings. It will thus be seen that there are two spaced-apart parallel links 60, 60 and two spaced-apart parallel links 61, 61 having their rear ends pivotally connected to the axle housing and all extending forwardly and downwardly from the latter when the transverse blade 30 is in the ground surface scraping position shown in Figs. 1 and 2.

Each of the forwardly extending links 60 and 61 is provided with a branching arm 63 and 68, respectively, as shown in Figs. 4 and 10. The links 60 and 61 together with their branching arms may each be of box-like construction as illustrated at 60, 60 and 63, 63 in Fig. 8 The forward ends of the links 60 and 61 are keyed at 64, 64 to the transverse shaft 65 which is a rock shaft journaled in the bearings 66, 66 and 67, 67 secured to the back of the plate 28 shown in rear elevation in Fig. 8 and in dotted line side elevation in Fig. 2.

In a similar manner the lower links 61, 61 together with their branch arms 68, 68 are keyed to the rock shaft 69 which is journaled in the bearings 70, 70 and 71, 71. As herein after more fully explained the shafts 65 and 69 serve as torsion shafts to stabilize the connections between the axle housing and the bowl frame.

Fig. 10 is a sectional plan view on the line 10—10 of Fig. 8 and shows a reinforcing plate 72 connected by cap screws to the plate 28, which cap screws also serve to mount the self-alining bearings 70, 71 on the plate 28. Longitudinal reinforcing plates 73 are welded at their rear ends to the front side of the plate 72 and may extend forwardly to the rear face of the plate 32 shown in Fig. 2. In a similar manner an additional reinforcing plate 74 may be provided as shown in Fig. 8.

The rear ends of each of the links 60, 60 and 61, 61 may be provided with a cylindrical extension 75 as shown in Fig. 2a, to which is keyed at 76 a bushing 77 threaded to receive the screw-threaded member 78 the ends of which are provided with extensions 79 and 80 which are journaled in bearings in the bracket plates 58, 58. This provision shown in Fig. 2a for connection of the rear ends of the links 60 and 61 to the axle housing, increases the bearing surface by reason of the threading of the screw-threaded member 78 into the screw-threaded bushing 77, and therefore a tight fit is maintained for a great length of time between the rear ends of the links 60 and 61 and the axle housing. In other words, increase in pivotal bearing surface prevents looseness at the pivotal connections to the bracket plates on the axle housing notwithstanding the great many vertical oscillations of the links 60 and 61 during severe operations in practice.

The cutting blade 30 is preferably composed of sections 30' and 30'' placed end to end as shown in Fig. 3 with the middle section 30' extending forwardly beyond the end sections 30''. By placing Figs. 3 and 4 end to end it will be seen that the tractor wheels 36, 36 track inside of the ends of the ground cutting element 30. While the intermediate section 30' makes a relatively deep cut, the end sections 30'' will cut suitable pathways for the tractor wheels 36, 36. This arrangement enables the tractor wheels to avoid irregularities of the ground surface and reduces to a minimum the transverse tilting of the tractor unit.

In order that the earth mover shown in elevation in Figs. 1 and 2 placed end to end and in plan in Figs. 3 and 4 placed end to end, may be steered on a relatively short radius, I have provided a steering unit 81 at the front central portion of the bowl frame. This steering wheel unit 81 comprises a yoke 82 to the lower ends of which is journaled a single steering wheel 83.

Extending upwardly from the yoke 82 and rigidly secured thereto is a steering post 84 as shown in Fig. 12. By means of the thrust bearings 85, 86, the steering post 84 is journaled to the steering head 87 which comprises a casing having a goose neck shape as shown in Figs. 1 and 12 and extending rearwardly and downwardly into an open space between the front upper cross-piece sections 27, 27 of the bowl frame. The inner ends of the cross-piece sections 27, 27 fit against the flat parallel outside surfaces 88, 88 and are welded thereto. It can readily be seen by referring to Figs. 3 and 12 that the cross-piece sections 27, 27 extend a substantial distance upwardly above the bottom plate 89 at the lower end of the steering head 87. The front upper side of the bowl frame may be provided with a cross-piece for co-operation with the sections 27, 27 in connecting the side plates 26, 26 of the bowl frame, leaving the space back of the cross-piece open, as shown in Fig. 3 and leaving the space below the cross-piece open between the side-plates 26 all the way to the transverse cutting blade 30 when the rotating gate 90 is in its uppermost position.

As shown in Figs. 12 and 13, a sprocket 91 is keyed to the steering post 84 and adapted to be connected by the sprocket chain 92 to the guide segment 93, as shown in Fig. 13. The free ends of the sprocket chain 92 are connected to levers 94, 94 which are pivoted at 95, 95 to the guide segment 93. By means of the set screws 96, 96 the slack in the sprocket chain 92 may be adjusted and the set screws locked in adjusted position by means of the nuts 97, 97.

The guide segment 93 is splined to a shaft 98 which is journaled at its ends to the plates 99, 99 by means of the thrust bearings 100, 100.

Splined to the shaft 98 is a rearwardly extending arm 101 to which is secured a depending ball 102 adapted to be connected to the drag link 110 which extends transversely through an opening 111 in the plate 88. Both of the plates 88 are provided with openings 111 so that the drag link 110 may extend in either direction while the corresponding cross-piece section 27 acts as a hood to protect the enclosed portion of the steering mechanism. The drag link 110 may be adjusted as to length and may be locked in adjusted position at 112.

As shown in Fig. 3, the drag link 110 extends to the upper left-hand corner of the top of the bowl frame for ball and socket joint connection at 113 to the bell crank 114 which is pivoted at 115 to a bracket 116 bolted to the plate 27, as shown in Fig. 14. Fig. 15 is a sectional elevation taken on the line 15—15 of Fig. 14, looking in the direction of the arrows. The arm 114' of the bell crank 114 is provided with a ball 113' for connection at 113 to the drag link 110. The other arm 114'' of the bell crank 114 extends through an opening 117 for connection at 118 to the forward end of the drag link 119.

As shown in Fig. 1, the drag link 119 extends rearwardly and downwardly for ball and socket joint connection at 120 to the bell crank 121 which is pivoted at 122 to the outer side of the plate 26. The bell crank 121 is mounted on a bracket 123 as shown in Figs. 1 and 16, Fig. 16 being a section taken on line 16—16 of Fig. 1, looking in the direction of the arrows. As shown in Fig. 16, the lower end of the arm 121' carries a ball 120'. The other arm 121" of the bell crank 121 is connected by a ball and socket joint 124 to the front end of the drag link 125, the rear end of which is connected by means of the ball and socket joint at 126 to the bell crank 127 shown in Fig. 18. It should be understood that each of the drag links 119 and 125 may be adjusted in length and held at adjusted length, as explained in connection with the drag link 110.

As shown in Figs. 3 and 4 placed end to end, the steering mechanism for the steering wheel unit 81 is extended along the left-hand side of the bowl frame because the steering wheel 43 is located at the left-hand side of the tractor unit.

Figure 19:
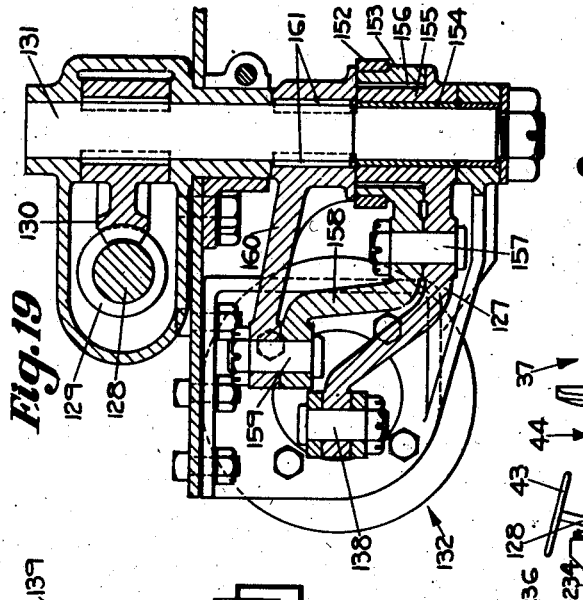
Fig. 19 is a sectional plan view taken on the line 19—19 of Fig. 18, looking downwardly in the direction of the arrows.
Figure 18:
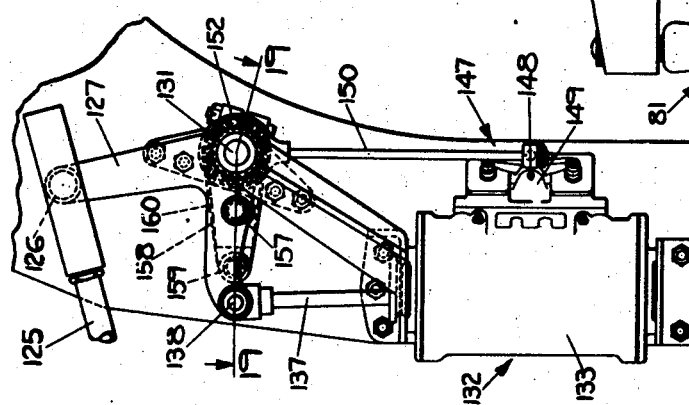
Fig. 18 represents the pneumatic motor and the connections to the steering wheel to enable the latter to control the pneumatic motor for the supply of power to the steering mechanism connected to the steering wheel unit.

As shown in Figs. 18 and 19, the steering post 128 of the manual steering wheel 43 has secured to its lower end portion a worm 129 which meshes with a worm segment 130, the latter being keyed to the horizontal shaft 131. Mounted loosely on the shaft 131 is the bell crank 127 which is connected at 126 to the drag link 125. It will thus be seen that by manually turning the wheel 43, the mechanical connections between the latter and the steering wheel unit at the front end of the earth mover, may be relied on to manually steer the machine while it is being propelled by the power traction unit 37.

In order to assist the operator in steering the machine, I have provided a pneumatic motor 132 comprising a cylinder 133 in which is mounted a piston 134 having a tubular piston rod 135 secured to the upper side thereof to permit pivoting at 136 to the upper side of the piston 134 of a connecting rod 137 the upper end of which is pivoted at 138 to the bell crank 127. The pneumatic motor 132 is double acting and so controlled as to assist the operator in moving the bell crank 127 either in one direction or the other.

Mounted on the engine frame of the power traction unit 37 is an air compressor 139 for connection to and operation by the engine. The take-off connection from the engine may be made through the coupling 139'. The location may be as indicated in Fig. 2. The air compressor 139 is connected by means of a pipe 140 to the compressed air tank 141 carried by the engine frame. The tank 141 is connected by the pipe 142 to the air supply chamber 143 for the valve mechanism 144.

Figure 20:
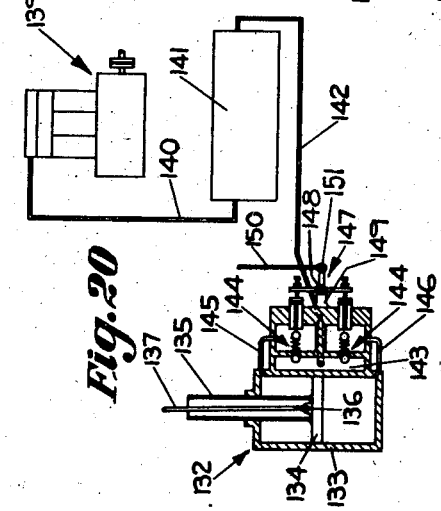
Fig. 20 is a piping diagram for the pneumatic motor shown in Fig. 18.

The valve mechanism is mounted at one side of the pneumatic motor 132, as shown in Fig. 20. Pipes 145 and 146 lead to the upper and lower ends of the motor cylinder 133 respectively. A rocking valve actuating device 147 is pivoted at 148 to a bracket 149. A connecting rod 150 is pivoted at its lower end at 151 to the rocking valve actuating device 147. The upper end of the rod 150 is connected to a circular strap 152 which is journaled on the bearing 153, as shown in Fig. 19.

The bell crank 127 is journaled by means of the bushing 154 on the shaft 131 but is not keyed thereto. The bell crank 127 is provided with a hub 155 which is surrounded by the hub 153 but the latter is spaced therefrom as indicated at 156.

The hub 153 is pivoted by means of the pivot pin 157 to the bell crank 127. In other words, the lever 158 is pivoted at 157 to the bell crank 127 and is provided with a hub 153 which is spaced at 156 from the hub 155, the hub 153 having journaled thereon the circular strap 152. The lever 158 is pivoted at 159 to the lever 160 which is keyed at 161 to the shaft 131. It will thus be seen that when the operator rotates the shaft 131 by means of the steering wheel 43, the lost motion at 156 must be taken up before the bell crank 127 can be actuated. Consequently before the operator transmits movement to the bell crank 127, the rod 150 will be actuated to operate the valve mechanism 144 to start the pneumatic motor 132 to boost the steering efforts of the operator. If the operator moves the lever 160 in a clockwise direction as viewed in Fig. 18, the rod 150 will be moved down, thereby opening the valve 144 to permit compressed air to flow through the pipe 146 beneath the piston 134. The piston will thus be forced upwardly to assist the operator to move the bell crank 127 in a clockwise direction as viewed in Fig. 18. If the operator desires to move the bell crank 127 in an anti-clockwise direction as viewed in Fig. 18, the rod 150 will be moved up, and such upward movement, as may be seen by referring to Fig. 20, will open the upper valve 144 to permit air pressure to flow through the pipe 145 to the upper side of the piston 134. The piston will therefore be moved down to aid the operator in moving the bell crank 127 in an anti-clockwise direction. It can readily be seen by referring to Figs. 18 and 19 that when the shaft 131 is rotated clockwise, the pivot 159 will move up and the hub 153 will move down causing the connecting rod 150 to move down. When the shaft 131 is moved anti-clockwise, the pivot 159 will be moved down and the hub 153 will be moved up, thereby causing upward movement of the connecting rod 150.

Inasmuch as the machine is adapted to travel over rough or irregular ground surfaces, the front wheel may be forced to one side or the other and when this occurs the pneumatic motor 132 and the valve operating mechanism automatically cushions the back thrust produced by the twisting action on the steering wheel unit and moreover the valve mechanism is automatically operated so as to cause the pneumatic motor 132 to tend to move the steering wheel back to its original position. For instance, if the back thrust by reason of the steering wheel striking an obstruction, is such that the bell crank 127 is moved clockwise as viewed in Fig. 18, the bell crank 127 will lift the pin 157 on the pin 159 as a fulcrum, the arm 160 being held stationary by the worm gearing and the operator grasping the steering wheel 43. The lifting of the pin 157 will lift the hub 153 and therefore the connecting rod 150 will be lifted to effect opening of the upper valve 144 to let air into the top of the cylinder 133 which effects a downward movement of the piston 134. Such downward movement of the piston 134 moves the connecting rod 137 downwardly and it will therefore be seen that the bell crank 127 will be moved counterclockwise as viewed in Fig. 18. Therefore whenever a back thrust is exerted on the bell crank 127 by the steering wheel striking an obstruction, the pneumatic motor will be automatically controlled to move the bell crank lever 127 against such backward thrust. In other words, when the front steering wheel strikes an obstruction moving it out of its proper position, the back thrust will operate the valve mechanism in such a way as to not only cushion the twisting of the front wheel unit, but to also move it back to its original position. It will thus be seen that under the various circumstances of steering operations, the pneumatic motor assists the operator in steering the machine and keeping it along its desired course of travel.

As shown in Figs. 2 and 8, the ejector plate 33 is pivoted at 163, 163 to the upper ends of the piston rods 164, 164 which are connected to pistons in the cylinders 165, 165, the lower ends of which are pivoted at 166, 166 to brackets secured to the plate 28. Each of the hydraulic motors 165, 165 is a double acting hydraulic motor so that the ejector plate 33 may be moved forwardly in the bowl frame or rearwardly to its position shown in Fig. 2.

The ejector plate 33 is connected by a pair of links 167, 167 as shown in Fig. 8 to the brackets 168, 168. The lower ends of the links 167 are pivoted to the brackets 168, while the upper ends are pivoted at 169, 169 to the upper back portion of the ejector plate 33. The relative relation between the pivots 163 and 169 is shown in dotted lines in side elevation in Fig. 2. It should be particularly noted that the links 164, 165 and 167 project upwardly and that therefore when the ejector plate is actuated by the hydraulic motors 165, the plate 33 and whatever material may be clinging thereto will move downwardly and forwardly by gravity, with the lower edge of the ejector plate scraping along the inclined surface of the receiving plate or moldboard 32. Inasmuch as the motors 165 are double acting they may be reversed rapidly by means of controlling valves so as to give the plate 33 a shaking or vibratory action to dislodge material that may be sticking thereto.

The gate 90 is provided with spaced-apart parallel side plates 170 each closely adjacent to inner walls of the side plates 26, as shown in Fig. 3. The upper edge 171 of each of the side plates 170 may be straight and approximately radial but the rear edge is circular, as indicated at 172 in Fig. 1. The lower forward edges of the gate 90 are connected to a transverse curved plate having the shape of a segment of a cylinder shown in dotted lines in Fig. 1 and in full lines in Fig. 7.

The gate side plates 170 are pivotally connected by means of self-alining bearings 173, 173 to the side plates 26, as shown in Fig. 1ª. Stub shafts 174 are connected to arms 175, the outer ends of which are pivotally connected at 176 to the piston rods 177 of the hydraulic motors 178. The rear ends of the hydraulic motors 178 are each pivoted at 179 to the rear upper corners of the bowl framework. The hydraulic motors 178 may be located above and outside of the planes of the side plates 26 under the protection of the lateral protecting covers or shields 180, 180.

The stub shaft 174 has a circular plate 90' at one end as shown in Fig. 1ª and such circular plate is secured to the gate 90 by means of the screws 90''. The arm 175 is retained on the shaft 174 by means of the plate 175' and the screws 175''. The self-alining bearing comprises two seats one welded to the gate 90 and the other secured to the plate 26 and the reinforcing plate 26'. A ring thrust bearing 173' is also included.

As the machine moves forward for the gathering of a load by means of the cutting blade 30, the latter is in a relatively flat position to make a deep cut in the ground surface, and the lower edges of the plates 26 in advance of the blade 30 may be forced into the ground surface by the action of the blade as it wedges into the ground. That this can readily be done may be understood from the fact that the bowl frame is entirely open in advance of the cutting blade and at such time the gate 90 is in an upper position. As the moldboard 32 fills up with gathered material, the weight of such material is added to other weight on the traction wheels, thus increasing traction of the power traction unit 37.

Figure 7:
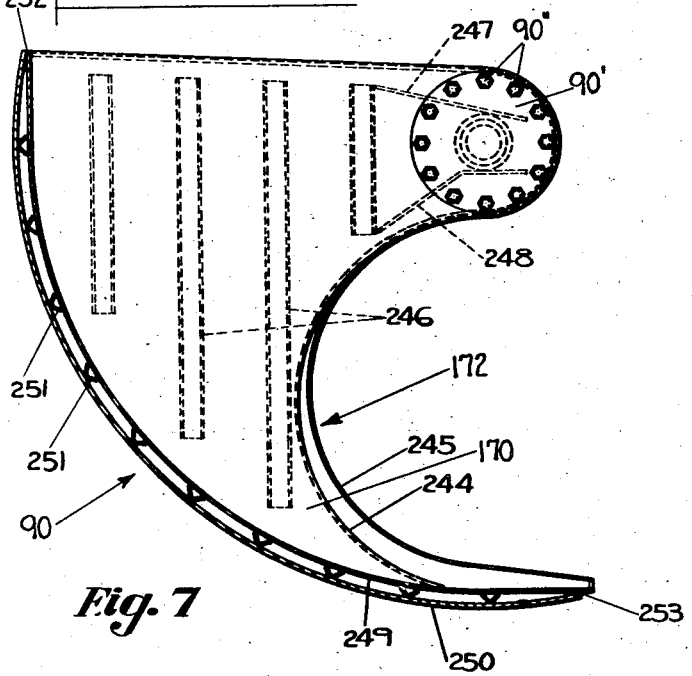
Fig. 7 is a side elevational view of the structure of the gate shown in dotted lines in Fig. 1.

As the rear portion of the bowl fills with material, the gate 90 is gradually moved down by the operator at his station operating the valve control levers illustrated diagrammatically in Figs. 4 and 17. By reason of the arcuate contour at 172 at the rear edges of the side plates 170 of the gate, the necessary power to move the gate into and under the material being collected, is reduced. Such power may be still further reduced by placing the edge 244 ahead of the edge 245 as shown in Fig. 7 so that the edge 245 will serve as a single cutting edge. In fact, the rear scooping edge of the gate 90 wedges into the material being collected with little obstruction, compared with side plates of a gate having rear radial edges.

In order to enable a separate tractor to push the machine with more power than can be exerted by the power traction unit 37, I have provided a pusher frame 181, as shown in elevation in Figs. 2 and 11 and in plan view in Fig. 4. The frame 181 diverges forwardly for pivotal connection at 182 to bracket plates 183 extending rearwardly from the axle housing. A reinforcing rod 184 may connect the plates 183, as shown in Fig. 4.

As shown in Fig. 11 the various members of the pusher frame 181 may be square or rectangular in cross-section by being constructed of angle irons welded together at meeting edges. Between cross-pieces 185, 186 is mounted a bolt 187 which extends through openings in the top and bottom plates 188, 189 secured to the cross-pieces 185, 186. A sleeve bearing and spacer 190 may engage the top plate 188 but is not secured thereto. The upper end of the bearing 190 is provided with a circular flange to provide a lower annular shoulder for engagement by the cup 191. Into the cup 191 is screw-threaded a tube 192, the upper end of which is welded to a plate 193. A short tube 194 is provided with a circular flange at its lower end having a shoulder engaging the lower edge of an opening in the plate 193. A spring 192 is located between the members 190 and 194. The spring holding tube 195 extends through an opening in the plate 196 which is carried by the bracket 197, the latter being bolted at 198 to the frame 199 which is rigidly secured to the side of the supporting frame of the internal combustion engine of the power traction unit 37. It should be understood that both the plates 193 and 196 are secured rigidly to the suspension bracket 197. When the parts are assembled, as shown in Fig. 11, the nut 200 may be relied on to hold them in proper relation.

The push frame 181 is suspended from the frame of the engine on the spring 192. The push frame 181 is also pivoted at 182 to the axle housing bracket 183. The plates 193, 196, the tube 195 and the cup 191 being rigid with the bracket 197, will remain in fixed relation to the body of the internal combustion engine or the frame which is rigidly attached thereto. When the push frame 181 moves down on its pivot 182, the bolt 187 will move the bearing member 194 downwardly to compress the spring 192, the lower end of which rests on the upper circular flange of the tube 190 and the latter rests on the cup 191, the tube 190 not being connected with the plate 188. In fact, the spring 192 cushions movement of the push frame 181 not only downwardly but also upwardly. When the spring is compressed by downward movement of the frame 181, the lower end of the tube 194 compresses the spring 192, and when the frame moves upwardly from its position shown in Fig. 11, the tube 190 is engaged by the plate 188, and the spring 192 is compressed by the upper end of the tube 190.

Connected to the rear end of the pusher frame 181 by means of the upwardly and rearwardly inclined bracket bars 201, 201 is a bumper plate 202 having the contour shown in Fig. 4. Welded to the lower central portion of the bumper plate 202 is a cylinder 203 as shown in Fig. 11.

To the left-hand end of the cylinder 203 is welded a limit stop 204 which has a square opening therethrough to receive the guide block 205 which is square in cross section and has an opening therethrough for receiving the rod 206. The rod 206 is keyed at 207 to the guide block 205. By means of a nut 208 a collar 209 is clamped to the forward end of the rod 206.

Within the cylinder 203 is a spring 210 which at its forward end engages the guide block 205 and at its rear end engages the guide block 211. The guide block 211 has a cylindrical opening therethrough for the rod 206 but the exterior of the guide block 207 is square and fits through a corresponding opening in the stop 212. The stop 212 may be connected by means of the screws 213 to the right-hand end of the cylinder 203 as viewed in Fig. 11.

Those portions of the guide blocks 205 and 211 which project into the cylinder 203 are provided with annular flanges 214 and 215 in position to engage the shoulders on the stops 204 and 211.

The right-hand end of the rod 206 as viewed in Fig. 11 is screw-threaded at 216 into the coupling member 217 and the latter is pinned at 218 to the right-hand end of the rod 206.

A push plate 219 is provided with coupling members 220 having openings therein which register with openings in the coupling member 217. The registering openings receive the coupling pin 221. While the plate 219 may oscillate on the vertical axis of the pin 221, it is desirable that it shall not rotate on the axis of the rod 206. When a separate tractor with its push plate engages the push plate 219 of Fig. 11, the connection to the push frame 181 is yielding by reason of the spring 210. The guide block 211 is movable toward the left to compress the spring 210. When the pin 221 is removed and the push plate 219 is detached, a pulling chain or cable may be inserted in the horizontal opening in the coupling member 217 and the pin 221 reinserted so that the machine shown in Figs. 1 and 2 may be pulled rearwardly by means of the separate tractor and in that event the guide block 205 may be moved toward the right as viewed in Fig. 11 while compressing the spring 210. It will thus be seen that the spring 210 is double acting in that it cushions the pushing thrusts forward as well as the pulling thrusts rearwardly.

Instead of connecting the pulling or towing chain or cable to the coupling member 217, it may be reeved about the end spool members 222 (Fig. 11) and 223 (Fig 2) which are mounted on the ends of a pipe 224 which is rigidly secured to the plates 225, 226 welded to the forward ends of the rearwardly converging frame members of the push frame 181. It should be understood that the ends of the pipe 224 are closed by the discs 222 and 223 but these discs are spaced from the depending plates 225, 226 so as to form the spool members for the hitching of the towing chain or cable thereto.

Reverting to the mechanism for operating the ejector plate 33, as shown in Figs. 2 and 8, it will be seen that a pair of pushing devices 227, 227 is mounted at the bottom of the L-shaped crosspiece 238' which is rigidly connected at its ends to the side plates 26, 26. As shown in Fig. 9, each pushing device 227 comprises a cylinder 228 within which is mounted a spring 229 between the inner end of the cylinder 228 and the head 230 carried by the rod 231. The latter is screw-threaded at its right-hand end as viewed in Fig. 9 to receive the nut 232. The nut engages the outer side of the bottom plate 233 of the cylinder 228 so as to limit the extent of outward movement of the head 230. When the ejector plate is in the position shown in Fig. 2, the heads 230 are held in the cylinders 228, and the springs 229 are then under compression. When the hydraulic motors 165 are operated to effect movement of the ejector 33 forwardly, the pushing devices 227, 227 are relied on to start the upper portion of the plate 33 toward the left so that gravity can act more readily to cause descent of the ejector 33. The pushing devices 227 are desirable for this purpose because the arms 167, 167 are inclined toward the left as viewed in Fig. 2 only at a small angle, the ejector plate 33 being located as near as possible to the rear end of the bowl frame.

Figure 24:
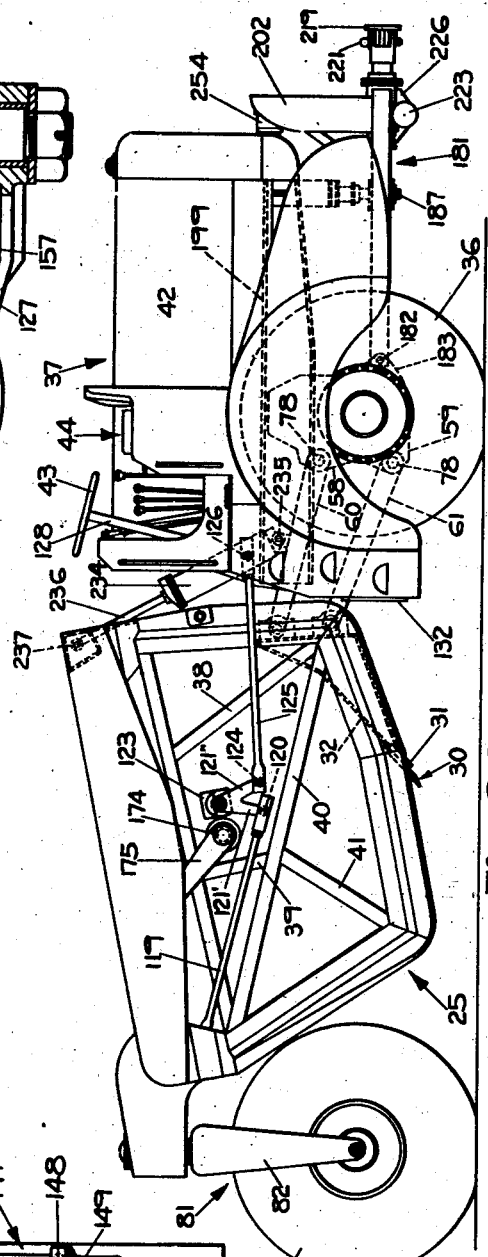
Fig. 24 is a side elevation similar to Figs. 1 and 2 placed end to end, but with the connections between the power tractor and the bowl frame in the relative positions which they occupy during the transportation of the gathered material from place to place.

After the bowl has been filled with gathered material the gate 90 is moved to its closed position shown in Fig. 1, after which the motors 234 are expanded to tilt the bowl to the position shown in Fig. 24. When the material is to be unloaded the gate 90 is gradually opened and the material empties from the bowl by gravity. The bottom 32 has a steep incline as shown in Fig. 24 and consequently nearly all of the material in the bowl is removed by gravity, particularly if it is dry and granular but if it is moist or damp it tends to remain in the rear portion of the bowl above the inclined bottom plate 32. It is therefore important in order to maintain the full capacity of the earth mover to positively remove the entire load of material from the bowl before going for another load.

When the ejector plate 33 is in its rearmost position, as shown in Fig. 2, upward forces are exerted at the pivot points 163 on the back of the ejector by maintaining upward pressures on the pistons in the motors 165. These upward forces tend to swing the points 169 toward the right, as viewed in Fig. 2, and the links 167 hold the ejector plate 33 in a predetermined position with its upper end against the cross-plate 238' and its lower end against the upper portion of the plate 32 thereby holding the pushing or starting devices 227 compressed.

When the ejector plate is to be operated the motors 165 are contracted to exert downward forces on the pivot points 163 at the back of the ejector plate. The starting devices 227 are then free to act to start the ejector on its downward course toward the bottom opening in the bowl. It will thus be seen that not only does gravity act on the ejector to lower the same with its lower edge scraping along the plate 32, but the motors 165 assist such gravity action in positively pulling the ejector down while the links 167 compel the ejector to move away from the back of the bowl toward the bottom opening therein. In this action the motors lean over toward the left as viewed in Fig. 2 but the pivots 163 and 169 vary only slightly from a dead center plane and therefore by expansion of the motors 165 the ejector may readily be restored to its initial position shown in Fig. 2.

Figure 6:
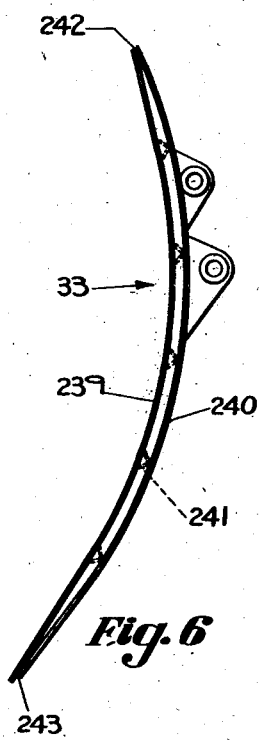
Fig. 6 is a side elevational view of the structure of the ejector shown in dotted lines in Fig. 2.

To secure the desired operation of the ejector both in moving it toward the bottom opening in the bowl and in restoring the ejector plate to its initial position, one pivot 169 is arranged closer to the back of the ejector plate than the other pivot 163, as shown in Figs. 2 and 6. When the ejector plate is in its initial position as shown in Fig. 2 the pivots 168 are located in such positions that the links 167 slant toward the left. A plane extending through the points 166, 163 intersects a plane extending through the points 168, 169.

In order to tilt the bowl frame from the position shown in Fig. 2 to the position shown in Fig. 24, two extensible hydraulic motors 234, 234 are pivotally connected at their lower ends at 235 to the upper spaced-apart links 60, 60. The motors 234, 234 being reciprocating hydraulic motors each has a piston rod 236 pivotally connected at its upper end at 237 to a rear crosspiece at the upper rear end of the bowl frame. In Fig. 8 the cross-piece 238 at the upper rear end of the bowl frame supports within the same the bearings 237, 237 for the upper ends of the piston rods 236, 236. Ample space is provided for the rods 236 to change their inclinations relative to the bowl frame, as may be seen by comparing Figs. 2 and 4.

It should be particularly noted that the hydraulic motors 234 are pivoted at their lower ends at 235, 235 on the spaced-apart links 60, 60 and are not connected to any part of the power plant or supporting framework of the engine or casings containing the transmission gearing for the engine. Likewise the parallel links 60, 60 and the parallel links 61, 61 are connected to the axle housing but not to any part of the engine supporting frame or any of the casings carried thereby. This arrangement prevents any of the stresses and strains due to the operation of the machine, being transmitted to such castings of the power plant that may not be able to withstand such loads. The axle housing may be made of steel and therefore fully capable of withstanding all the stresses and strains due to operation of the machine including gathering, hauling and spreading.

As shown in Fig. 6, the ejector 33 may be composed of two plates 239 and 240 connected by spacers 241, 241 extending transversely to substantially the full width of each plate. These spacers are V-shaped in cross-section with the edges contacting with the opposed faces of the plates 239 and 240 welded to such faces. The ends of the plates 239 and 240 may be welded together at 242 and 243.

The gate 90 may have end plates 244, 245 connected by the spacers 246, 246 each of which is V-shaped in cross-section, with those edges contacting with the opposing faces of the plates 244 and 245 welded thereto. Additional flat strips 247, 248 may be welded to the opposing faces of the plates 244 and 245 as indicated in dotted lines in Fig. 7.

The bottom of the gate 90 may be composed of spaced-apart plates 249 and 250 each having the shape of a segment of a cylinder. These plates are separated by the V-shaped spacers 251, 251 with the edges contacting with the opposing faces of the plates 249 and 250 welded thereto. Where the plate ends meet continuous welding may be performed at 252 and 253. The V-shaped spacers 241, 246 and 251 may be tack-welded along the edge ends and spot welded along the apices.

Fig. 17 is a piping diagram for the control of the operation of the various hydraulic reciprocating motors. The pump 254 is connected to the front end of the crank shaft of the engine in the position shown in Figs. 2 and 4. A suction pipe 255 is connected between the pump 254 and the supply tank 256 located adjacent the operator's station. A return pipe 257 connects the manifold control valve 258 to the tank 256. A supply pipe 259 leads from the pump 254 to the manifold control valve 258. By means of the valve control levers 261, 262 and 263 the hydraulic motors 234, 178 and 165 may be operated. The valve levers 261, 262 and 263 are located adjacent the operator's station as shown in Fig. 4. A high pressure relief valve 260 is located between the supply pipe 259 and the return pipe 257 and is adapted to be opened in the direction of the arrow 264 when a predetermined maximum pressure is reached.

When the deepest cuts are made it is preferred to use the intermediate section 30' of the cutting blade projecting forwardly as shown in Fig. 3 so that the transverse length of the cut will be reduced, thereby reducing the necessary power to push the machine forwardly. As stated above, the additional tractor is employed either alone or with the assistance of the power traction unit 37 to operate the machine during the gathering of material by cutting the ground surface with the cutting blade 30. If the cutting blade meets with particularly hard material which renders it difficult for even the additional tractor to operate the cutting blade because the full length of the blade engages such hard material, the additional tractor may engage the push plate 219 at an angle so as to swerve the cutting blade 30 out of its previous path of travel by angling the blade, thus breaking the cut.

The pushing frame remains substantially horizontal throughout all the operations. That is to say, when the bowl frame is in its lowermost position for the cutting blade to dig into the ground, the pushing frame 181 is substantially horizontal and acts in almost a direct line with the lower pair of parallel links 61, 61 to secure maximum forward pushing effect. Of course, there is also a pushing effect through the upper pair of parallel links 60, 60 because the pushing frame is connected to the axle housing and the latter is connected to not only the lower pair of parallel links 61, 61 but also to the upper pair of parallel links 60, 60. During the forward gathering operations by operation of the cutting blade, the motors 234 are locked in adjusted positions being double acting motors provided with valve mechanism at 261 to lock the pistons therein against movement in either direction. Irrespective of the depth of cut, the pushing frame 181 remains substantially horizontal and the connections between the bowl frame and the axle housing constitute a rigid structure which is effective to prevent any buckling upwardly of the bowl frame relatively to the power traction unit 37 during cutting and gathering operations. The actual pushing operations through the links 60 and 61 are forwardly and downwardly so as to effectively hold the cutting blade to its work. That the push frame 181 remains substantially horizontal can readily be seen by comparing Figs. 2 and 24 because in the latter view even when the bowl frame is moved to its transporting position, the push frame 181 still remains substantially horizontal.

The earth mover shown in the accompanying drawings being self-propelled, can be used without an extra pushing tractor for light scraping or gathering work and whenever the filled bowl is to be transported the power traction unit 37 alone will be found sufficient. The power traction unit may move the machine forwardly at eight different speeds and rearwardly at two different speeds and therefore the spreading operations may be performed by moving the machine forwardly or rearwardly. When moved forwardly the adjusted height of the rear end of the bowl frame will enable the cutting blade 30 to act as a strike-off blade to regulate the depth of the spread material, and when the machine is moved rearwardly the lower edge of the gate 90 may be adjusted to various elevations to act as a strike-off device to regulate the depth of the spread material. During gathering operations or spreading operations the single steering wheel may move into such a depression as to turn the steering wheel too far in one direction or the other, thus tending to block forward movement of the machine, and in that event the rear end of the bowl frame may be pulled down to the ground surface by means of the motor 234 to such an extent as to lift the steering wheel out of the hole so that the operator may regain steering control thereof.

A single steering wheel is highly desirable not only to reduce the number of tires to three in the machine, but also to enable the machine to turn on a short radius and this is particularly desirable when the machine is traveling along a steep embankment and adjacent thereto.

The links 60, 60 and 61, 61 have their forward ends keyed to the shafts 65, 69. In like manner the branch arms 63, 63 and 68, 68 are keyed to the shafts 65 and 69. This is illustrated in Fig. 10. The rods 65 and 69 are therefore torsion rods and become important to keep the bowl frame from twisting or tilting transversely when the machine travels over rough ground.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. An earth mover comprising the combination with a steering wheel unit, of a scraper bowl having its front end supported on said steering wheel unit, mechanism for supporting the rear end of said scraper bowl for tilting adjustment of the bowl on the transverse axis of said steering wheel unit, steering mechanism mounted on said bowl and connected to said steering wheel unit, and means on said supporting mechanism connected to said steering mechanism to operate the latter in the various tilted adjustments of said bowl.

2. An earth mover comprising the combination with a bowl frame, of a steering unit at one end of said bowl frame, a supporting unit connected to the other end of said bowl frame, means between said supporting unit and said bowl frame to tilt the latter on the steering unit as a pivot, an intermediate lever pivoted to said bowl frame to rock relatively thereto, a drag link extending from said lever toward that end of the bowl frame where the steering unit is located, an additional drag link extending from said lever toward the other end of said bowl frame, means connecting the first-named drag link to said steering unit, steering operating means on said supporting unit, and means connecting said steering operating means to said additional drag link, said steering operating means being adapted to act through said drag links and intermediate lever to effect operation of said steering wheel unit irrespective of the elevation of the rear end of said bowl frame relative to said supporting unit.

3. An earth mover comprising the combination with a carrier, of a steering unit connected to the front end thereof, a supporting unit, two pairs of spaced links each pair pivoted at their rear ends to said supporting unit and each pair pivoted at their forward ends to the lower rear portion of said carrier, the spacing of the pivots of each pair of links being greater at their rear ends than at their forward ends, and means connected between some of said links and the upper rear end portion of said carrier to effect adjustment in elevation of said carrier and the upright swinging of said pairs of links on their pivots, and means for operating said steering unit.

4. An earth mover comprising the combination with an earth scoop and carrier, of a power traction unit, means for supporting said carrier in advance of said power traction unit, said supporting means comprising a plurality of links extending downwardly and forwardly from the lower portion of said power traction unit to the rear lower portion of said carrier, and a pusher frame pivoted at its front end to the lower portion of said power traction unit and suspended intermediate its ends from said power traction unit, said pusher frame being adapted to be engaged by a separate tractor while the downwardly extending links serve to hold the scoop and carrier to their work.

5. An earth mover comprising the combination with a cutting blade, of an earth receiving plate extending upwardly and rearwardly from said cutting blade, a curved ejector plate having a lower edge movable along said receiving plate, a bowl frame having an open front, a plurality of links connecting the inside back of the bowl frame to said ejector plate to confine movement of the latter forwardly and downwardly to maintain the lower edge of the ejector plate in scraping relation to said receiving plate, fluid pressure motor mechanism connected as link mechanism between the inside back of the bowl frame and said ejector plate, and means for controlling said fluid pressure motor mechanism to effect operation of said ejector plate to move toward said opening material gathered by said cutting blade onto said receiving plate.

6. As an article of manufacture an ejector for an earth mover, comprising spaced curved plates connected by spaced reinforcements to provide for meeting ends to form a scraping edge for the ejector.

7. An earth mover comprising the combination with a bowl, of a steering unit at one end of said bowl, means connecting said bowl and steering unit and providing for tilting movement of said bowl on a transverse axis, a supporting unit connected to the other end of the bowl, means between the supporting unit and the bowl for tilting the latter on said transverse axis, an intermediate steer lever pivoted to one side of the bowl to rock relatively thereto, a drag link extending from said lever toward that end of the bowl where the steering unit is located, an additional drag link extending from said lever toward the other end of said bowl, means connecting the first-named drag link to said steering unit, steering operating means on said supporting unit, and means connecting said steering operating means to said additional drag link, the construction and arrangement being such that said steering unit may be operated from said supporting unit irrespective of the various positions to which said bowl may be tilted.

8. An earth mover comprising the combination with an earth carrier, of a single steering wheel, a yoke connected to said steering wheel, a steering post extending upwardly from said yoke, a sprocket connected to said post to rotate therewith, a head secured to said earth carrier, means for journaling said post to said head, a rock shaft journaled in said head parallel to said post, a sprocket chain meshing with said sprocket, a guiding segment secured to said rock shaft, mechanism for securing said sprocket chain to said guiding segment, a steering arm secured to said rock shaft, and mechanism mounted on said earth carrier and connected to said steering arm to swing the latter and thereby effect steering of said earth carrier by means of said single steering wheel.

9. An earth mover comprising the combination with a carrier, of steering mechanism therefor, a supporting connection between said carrier and said steering mechanism, a supporting unit, a pair of lower parallel links connecting said supporting unit to said carrier, a torsion shaft connecting said lower parallel links, a pair of upper parallel links connecting said supporting unit to said carrier, an additional torsion shaft connecting said upper parallel links, and a pair of extensible fluid pressure motors connecting said upper links to said carrier for adjustment of elevation of the latter.

10. An earth mover comprising the combination with a two wheel power traction unit tiltable on the axis of the supporting wheels and comprising an axle housing, of a pusher frame connected to said power traction unit including a pivotal connection to said axle housing to support said pusher frame in horizontal position for engagement by a separate pushing tractor, an earth carrier, front support means for said carrier, a plurality of links connecting said housing to the lower rear portion of said carrier, and a plurality of extensible hydraulic motors connected between some of said links and the upper rear portion of said carrier to adjust the elevation of the latter, said motors serving as links and serving to co-operate with the aforesaid plurality of links and their connections between the axle housing and said carrier to maintain said pusher frame in substantially horizontal position for the various elevated positions of the carrier.

11. An earth mover comprising the combination with a two wheel power traction unit, of a pusher frame connected thereto to occupy a horizontal position, front support means for said carrier, an earth carrier, a pair of upper parallel links connecting said power traction unit to the lower rear portion of said carrier, a pair of lower parallel links connecting said power traction unit to the lower rear portion of said carrier, a pair of extensible hydraulic motors connecting the upper links to the upper rear portion of said carrier, and means for controlling said motors to adjust the elevation of said carrier, the said motors co-operating with said links and their connections between said power traction unit and said carrier to prevent substantial tilting of said power traction unit and thereby maintain substantially horizontal the pusher frame for various adjusted elevations of said carrier.

12. An earth mover comprising the combination with a scraper bowl, of a steering wheel unit for carrying the front end of the bowl, a power traction unit, means connected between the power traction unit and the rear end of the bowl for adjusting the elevation of such rear end and supporting the same at adjusted elevation, said bowl being tiltable on the horizontal axis of the steering unit and occupying the space between the front end of said tractor unit and said steering wheel unit, and means extending from a station on the power traction unit to said steering wheel unit for operating the latter from such station irrespective of the elevation of the rear end of the bowl relative to said power traction unit.

13. An earth mover comprising the combination with a scraper bowl, of a steering wheel unit having horizontal and vertical axes, mechanism for carrying the front end of said bowl on said steering wheel unit for tilting movements relative to the latter on said horizontal axis, the steering unit itself being swingable on said vertical axis, a power traction unit, adjustable mechanism for carrying the rear end of said bowl on the front end of said power traction unit and for effecting such tilting movements as those aforesaid, and mechanism supported in part on said bowl and extending from a station on the power traction unit along said bowl to said steering wheel unit for swinging of the latter on said vertical axis from said station.

14. An earth mover comprising the combination with a scraper bowl, of a steering wheel unit for supporting the front end of said scraper bowl for tilting adjustment of the latter on a horizontal axis, an unstable tractor, pushing connections comprising a plurality of links between said tractor and the rear end of said bowl, supporting means between the tractor and said bowl and connected to both for tilting the bowl on said horizontal axis, and means for operating said steering wheel unit to steer the earth mover while being pushed over the ground by said tractor.

15. An earth mover comprising the combination with an earth carrier, of a steering wheel unit for supporting the front end of said carrier for tilting adjustment on a horizontal axis, a power traction unit rearwardly of said carrier, linking mechanism connecting said power traction unit to said earth carrier, and fluid pressure motor mechanism between said earth carrier and said link mechanism for adjusting the tilting of said earth carrier on said horizontal axis relative to the ground surface.

16. An earth mover comprising the combination with an earth carrier, of a steering unit therefor, mechanism connecting the front end of said carrier on said steering unit to afford tilting of the carrier on a horizontal axis, a wheeled supporting unit, link mechanism connecting said supporting unit to said carrier, and fluid pressure motor means mounted on a portion of said link mechanism and connected to said carrier for tilting adjustment of said carrier on said horizontal axis.

17. An earth mover comprising the combination with a bowl frame having a forward bottom opening therein, a moldboard plate extending upwardly and rearwardly from the rear edge of said opening, an ejector plate extending upwardly from the rear end portion of said moldboard plate, mechanism comprising spaced-apart parallel links for connecting said ejector plate to the rear end of said bowl frame for movement toward said opening by gravity while the lowermost edge of said ejector plate scrapes downwardly and forwardly along said moldboard plate, and means comprising fluid-pressure motor mechanism pivotally connected between the rear end of said bowl frame and the back of said ejector to pull downwardly on the latter to assist the aforesaid gravity action in forcing material out of the rear portion of said bowl frame, the construction and arrangement being such that when said fluid-pressure motor mechanism is contracted the ejector plate is pulled down for forward movement toward said opening as controlled by said parallel links and when said motor mechanism is expanded the ejector plate will be restored to initial position at the back of the bowl frame.

18. As an article of manufacture, a gate adapted to be pivotally mounted in an earth mover and comprising a curved bottom having a thin digging edge, end plates connected to the ends of said bottom, each of said end plates having semi-circular edges leading from said digging edge toward said bottom and thence upwardly toward the pivotal axis of the gate, and additional end plates connected to the inner walls of said first-named end plates by spaced interior reinforcements, the said additional end plates also having semi-circular edges with their lower portions meeting the inner walls of the first-named end plates between the semi-circular edges of the first-named end plates and said curved bottom.

19. An earth mover comprising the combination with an earth carrier, of a steering wheel unit comprising a yoke with a steering post extending upwardly therefrom, a head secured to said earth carrier, means for journaling said post in said head, a rock shaft journaled in said head parallel to said post, a guiding segment secured to said rock shaft, driving mechanism comprising a flexible draft element secured to said guiding segment and connected to said post, a steering arm secured to said rock shaft, and mechanism mounted on said earth carrier and connected to said steering arm to swing the latter and thereby effect steering of said earth carrier by means of said steering wheel unit.

20. An earth mover comprising the combination with a steering wheel unit, of a scraper bowl, a supporting unit, means for supporting the front end of said scraper bowl on said steering wheel unit, means for supporting the rear end of said scraper bowl on said supporting unit, said scraper bowl being mounted between said steering wheel unit and said supporting unit for tilting adjustment relative to the supporting unit, steering mechanism mounted on said bowl and connected to said steering wheel unit, and means on said supporting unit connected to said steering mechanism to operate the latter in the various tilted adjustments of the bowl.

21. An earth mover comprising the combination with an earth carrier, of a steering wheel unit, a steering head secured rigidly to said earth carrier, mechanism carried by said head for actuating said steering wheel unit, a supporting unit rearwardly of said earth carrier, supporting connections between the rear end of said earth carrier and the front end of said supporting unit for carrying the rear end of said earth carrier at adjusted elevations, and means extending laterally along the front and thence along one side of the earth carrier to said supporting unit for operating said actuating mechanism from a station on said supporting unit irrespective of the position to which the rear end of the earth carrier is adjusted relative to said supporting unit.

22. An earth mover comprising the combination with an earth carrier comprising a bowl frame, of a steering wheel unit, mechanism for supporting the front end of said earth carrier on said steering wheel unit, a supporting unit at the rear of said bowl frame, means for supporting on said last-named unit the rear end of said bowl frame for tilting adjustment of the latter on the transverse axis of said steering wheel unit, flexible steering mechanism extending from an operator's position on said unit to said steering wheel unit, and means for controlling the aforesaid adjustment in elevation of the rear end of the bowl frame relative to said supporting unit, the flexibility of said steering mechanism being such as not to interfere with such adjustment in elevation.

23. An earth mover comprising the combination with an earth carrier, of a steering unit, mechanism for supporting the front end of said earth carrier on said steering unit, a supporting unit, an engine on said supporting unit, a hydraulic pump connected to said engine for operation thereby, means comprising hydraulic motor mechanism for supporting the rear end of the earth carrier on said supporting unit for adjustment in elevation relative thereto, means for controlling said hydraulic motor mechanism to secure tilting of the earth carrier on the horizontal axis of said steering unit, a rotatable gate within said earth carrier, additional hydraulic motor mechanism connected to the gate for rotating the same to open or close an opening in the front end portion of said earth carrier, means for controlling said additional hydraulic motor mechanism to effect such rotation of said gate, an ejector within said earth carrier, additional hydraulic motor mechanism for operating said ejector, means comprising a cutting blade at the bottom of said earth carrier for gathering material from the ground surface and scooping it into said carrier, and means for controlling said last-named hydraulic motor mechanism to effect operation of said ejector to eject gathered material from the carrier through said opening while said gate is open.

24. An earth mover comprising the combination with a gathering bowl having an opening in its front side and gathering mechanism comprising a transverse cutting blade at its bottom, of a steering wheel unit, mechanism mounting the front end of said gathering bowl on said steering unit, a power traction unit comprising an axle housing, pushing mechanism extending from the rear end of said power traction unit to said axle housing, additional pushing mechanism between said axle housing and said gathering bowl, means between said power traction unit and said gathering bowl to elevate the latter for transportation, a gate in said bowl, means for operating said gate to gradually close said opening during the filling of said bowl and to operate said gate to open the same during the emptying of said bowl during transportation of the machine by means of said power traction unit, and ejector mechanism for pushing the material toward said opening during the spreading of the material.

25. An earth mover comprising the combination with a bowl having an opening in front of gathering mechanism, of a steering wheel unit, mechanism mounting the front end of said bowl on said steering unit, a power traction unit comprising an axle housing, pushing mechanism connected to said axle housing and extending rearwardly therefrom, additional pushing mechanism connected between said axle housing and said bowl, elevating mechanism between said power traction unit and said bowl, a gate for said opening, and means for actuating said gate to control the height of such opening from the ground surface when the bowl is being emptied during transportation of the earth mover and thereby enable said gate to act as a strike-off device to regulate the depth of the spread material.

26. An earth mover comprising the combination with a gathering bowl having a bottom ground engaging cutting blade and an open front side, of a steering wheel unit, mechanism supporting the front end of said bowl on said steering wheel unit, a power traction unit rearwardly of said bowl and comprising an axle housing, supporting connections between the rear side of said bowl and said power traction unit comprising pushing mechanism extending forwardly from said axle housing, said supporting connections also comprising means for adjusting the elevation of the rear side of the bowl, steering mechanism connected to said steering wheel unit and operable from a station on said power traction unit, pusher mechanism connected to said axle housing and extending rearwardly therefrom in position to be engaged by a power tractor for addition to said power traction unit when said cutting blade is to make a relatively deep cut to fill said bowl, a gate for controlling the extent of opening in the front side of said bowl, and means for operating said gate to gradually close the same during filling of the bowl and gradually opening the same during emptying of the bowl for spreading of the material, the filling of the bowl being effected with the help of the power tractor, and transportation and material spreading being effected by the power traction unit alone.

27. An earth mover comprising the combination with an earth carrier, of steering apparatus connected thereto, a power traction unit comprising supporting wheels, a push frame pivoted at its forward end to said power traction unit and resiliently suspended from the latter to occupy a horizontal position, two pairs of links pivotally connected to said power traction unit and pivotally connected to said earth carrier in positions to transmit pushing forces on said carrier when exerted by a tractor on said push frame, and means comprising fluid-pressure motor mechanism for tilting said carrier on the horizontal axis of the steering apparatus.

28. An earth mover comprising the combination with a scraper bowl, of a steering wheel unit for carrying the front end of said scraper bowl, a supporting unit, adjustable mechanism between the rear end of said bowl and the front end of said supporting unit for supporting the rear end of the scraper bowl at various elevations relative to the ground surface, the sole support for the front end of the scraper bowl being said steering wheel unit and the sole support for the rear end of the scraper bowl being the front end portion of the supporting unit and the said adjustable supporting mechanism, the scraper bowl occupying the space between said steering unit and the front end of said supporting unit, and steering mechanism extending from an operator's station on said supporting unit along said scraper bowl to said steering wheel unit irrespective of the adjusted position of the scraper bowl.

29. An earth mover comprising the combination with a steering wheel unit, of a scraper bowl having its front end supported on said steering wheel unit, a supporting unit rearwardly of said scraper bowl, means for supporting the rear end of said scraper bowl on the front end portion of said supporting unit for tilting adjustment of the scraper bowl on the horizontal transverse axis of the steering wheel unit, and means for operating said steering wheel unit from said supporting unit, said means comprising steering mechanism extending from said supporting means along said scraper bowl to said steering wheel unit.

30. An earth mover comprising the combination with a steering wheel unit, of a scraper bowl having its front end supported on said steering wheel unit, a wheeled supporting unit, connections between said wheeled supporting unit and said scraper bowl comprising a pair of lower links and a pair of upper links, expansible fluid-pressure motor mechanism between the upper links and the upper rear end portion of said scraper bowl to effect tilting of the latter on the horizontal transverse axis of the steering wheel unit, and mechanism for operating said steering wheel unit, said last-named mechanism extending along said scraper bowl to said steering wheel unit.

31. An earth mover comprising the combination with a scraper bowl having an open front, of an earth receiving plate extending rearwardly and upwardly, an ejector adapted to have its lower edge rest by gravity on said receiving plate, a plurality of links connecting the scraper bowl to the back of the ejector to confine movement of the latter forwardly and downwardly while its lower edge remains in scraping relation with said receiving plate, fluid-pressure motor mechanism connected as link mechanism between the scraper bowl and the back of the ejector, and means for controlling said fluid-pressure motor mechanism to effect operation of said ejector to move toward said opening material on said receiving plate, the construction and arrangement being such when said ejector is in initial position at the back of the bowl a downward pull on the ejector plate may be exerted by the motor to assist the action of gravity on said ejector to remove material from the bowl by scraping action along said receiving plate, such movement of the ejector being limited by said links co-acting with the motor mechanism acting as link mechanism.

32. An earth mover comprising the combination with a two wheel supporting unit tiltable on the axis of the supporting wheels and comprising an axle housing, of a horizontal pusher frame extending rearwardly to a position to be engaged by a pushing tractor, a steering unit, a scraper bowl, mechanism supporting the front end of said scraper bowl on said steering unit, interlocking means comprising expansible fluid pressure motor mechanism for supporting the rear end of said bowl at various elevations on said supporting unit, said bowl being tiltable on the horizontal transverse axis of said steering unit while the latter together with said pusher frame are maintained substantially horizontal by said interlocking means, and mechanism for operating said steering unit from a station on said supporting unit.

33. An earth mover comprising the combination with a unstable tractor, of a scraper bowl, a steering wheel unit including a wheel mounted on a substantially horizontal axis, mechanism supporting the front end of the scraper bowl on said steering wheel unit and for swinging movement of said bowl about the horizontal axis of said steering wheel unit, a pair of parallel upper links pivotally connected at their ends to said tractor and to said scraper bowl, means for tilting said scraper bowl on said steering wheel axis to adjust the elevation of the rear end thereof, a pair of parallel lower links pivotally connected at their ends to said tractor and to said scraper bowl, and pushing mechanism extending horizontally from the rear end of said unstable tractor into position to be engaged by a separate tractor during operation of said scraper bowl in gathering material from the earth's surface, the construction and arrangement being such that the lower links co-operate with the upper links and said tilting means to hold the pushing mechanism substantially horizontal during operation of the scraper bowl with the separate tractor engaging said pushing mechanism.

34. An earth mover comprising the combination with a ground digging scoop, of a supporting unit comprising a frame, adjustable means for rigidly connecting said scoop to said supporting unit to carry the scoop at various elevations relative to the ground surface, a pusher frame pivoted at its front end to said supporting unit, and mechanism for suspending said pusher frame intermediate its ends from said supporting unit, said pusher frame being adapted to be pushed by a tractor to effect operation of said ground cutting scoop while rigidly connected to said frame at adjusted elevation.

35. An earth mover comprising the combination with a scraper receiver, of a steering wheel unit supporting the front end of said receiver for tilting adjustment of the latter on the horizontal axis of the steering wheel, a wheeled supporting unit behind said scraper receiver, a plurality of links connecting said supporting unit to the rear end of said scraper receiver, means between the said supporting unit and the rear end of said scraper receiver to adjust the elevation of the latter by tilting the same on said horizontal axis, said links extending downwardly and forwardly when said scraper receiver is in earth scraping position, mechanism on said supporting unit in position to be engaged by a pushing power tractor to effect operation of said scraper receiver while said links extend downwardly to hold the scraper receiver to its work, and means for operating said steering wheel unit from a station on said supporting unit.

36. In a dirt scraping and hauling vehicle of the class described, in combination, a receptacle body, means to support said body for travel movement comprising a front wheel unit and a rear wheel and axle unit, scraper means carried by the receptacle body, instrumentalities intermediate the receptacle body and the rear wheel and axle unit for raising and lowering the receptacle body relatively to the front and rear wheel units, compression members included in the rear wheel and axle unit aforesaid and extending rearwardly from the vehicle to be engaged by a secondary pushing vehicle, said raising and lowering instrumentalities including a pusher frame intermediate the axle portion of the rear axle and wheel unit and the rear portion of the receptacle body whereby forces transmitted to the compression members will be caused to be transmitted through the pusher frame to the rear portion of the receptacle body.

37. A dirt scraping and hauling vehicle as claimed in claim 36, wherein the pusher frame comprises parts having pivotal connection with the axle portion of the rear axle and wheel unit and having pivotal connection with the receptacle body.

38. An earth mover comprising a two-wheeled supporting unit, a steering unit, a scraper bowl having its front end pivotally supported by said steering unit, connections between said scraper bowl and said supporting unit comprising upper and lower links pivotally connected at their ends to said supporting unit and to said scraper bowl, the pivotal connections to the scraper bowl being closer together than the pivotal connections to the supporting unit, and means for raising and lowering the scraper bowl relative to the supporting unit, said bowl tilting about its front pivotal support during such raising and lowering movement.

CECIL E. PATTERSON.

REFERENCES CITED

The following references are of record in the file of this patent:

UNITED STATES PATENTS

| Number | Name | Date |
|---|---|---|
| 1,276,642 | Gee | Aug. 20, 1918 |
| 1,453,231 | Wheelock | Apr. 24, 1923 |
| 1,530,779 | LeTourneau | Mar. 24, 1925 |
| 1,569,011 | Gilbert | Jan. 12, 1926 |
| 1,641,802 | Danly | Sept. 6, 1927 |
| 1,685,171 | McVicker et al. | Sept. 25, 1928 |
| 1,857,157 | LeTourneau | May 10, 1932 |
| 1,869,698 | Komfala | Aug. 2, 1932 |
| 1,966,741 | Smith | July 17, 1934 |
| 1,996,723 | Henneuse | Apr. 2, 1935 |
| 2,008,908 | Gustafson | July 23, 1935 |
| 2,072,306 | Keeler | Mar. 2, 1937 |
| 2,088,091 | Moore | July 27, 1937 |
| 2,013,588 | LeBleu | Dec. 28, 1937 |
| 2,111,134 | Allin | Mar. 15, 1938 |
| 2,112,288 | Heil | Mar. 29, 1938 |
| 2,146,807 | Ferari | Feb. 14, 1939 |
| 2,147,077 | Backman | Feb. 14, 1939 |
| 2,156,601 | Mosling et al. | May 2, 1939 |
| 2,169,946 | Frentzel, Jr., et al. | Aug. 15, 1939 |
| 2,181,760 | LeBleu | Nov. 28, 1939 |
| 2,182,670 | LeBleu | Dec. 5, 1939 |
| 2,204,033 | Austin | June 11, 1940 |
| 2,249,356 | Goodman | July 15, 1941 |
| 2,252,763 | French | Aug. 19, 1941 |
| 2,262,310 | Wooldridge | Nov. 11, 1941 |
| 2,269,502 | Wilson et al. | Jan. 13, 1942 |

FOREIGN PATENTS

| Number | Country | Date |
|---|---|---|
| 18,184/29 | Australia | Oct. 28, 1929 |